US 7,483,980 B2

(12) United States Patent
Thomas

(10) Patent No.: US 7,483,980 B2
(45) Date of Patent: Jan. 27, 2009

(54) METHOD AND SYSTEM FOR MANAGING CONNECTIONS IN A COMPUTER NETWORK

(75) Inventor: David Andrew Thomas, Atherton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1541 days.

(21) Appl. No.: 10/289,288

(22) Filed: Nov. 7, 2002

(65) Prior Publication Data

US 2004/0093415 A1  May 13, 2004

(51) Int. Cl.
*G06F 15/16* (2006.01)
(52) U.S. Cl. .................... 709/225; 370/254; 370/353
(58) Field of Classification Search ......... 709/200–203, 709/217–227; 370/218, 244, 250, 254, 299, 370/353
See application file for complete search history.

(56) References Cited

U.S. PATENT DOCUMENTS

| | | | |
|---|---|---|---|
| 5,787,249 A | | 7/1998 | Badovinatz et al. |
| 5,964,857 A | | 10/1999 | Srinivasan et al. |
| 6,006,264 A | * | 12/1999 | Colby et al. ............... 709/226 |
| 6,496,866 B2 | * | 12/2002 | Attanasio et al. ............ 709/239 |
| 6,850,982 B1 | * | 2/2005 | Siegel ........................ 709/227 |
| 7,092,399 B1 | * | 8/2006 | Cheriton ..................... 370/401 |
| 2002/0095528 A1 | * | 7/2002 | Harper et al. ............... 709/330 |
| 2002/0166080 A1 | * | 11/2002 | Attanasio et al. ............ 714/15 |

OTHER PUBLICATIONS

"Locality-Aware Request Distribution in Cluster-Based Network Servers," by Vivek S. Pai, et al. (Proceedings of the ACM Eighth International Conference on Architectural Support for Programming Languages and Operating Systems (ASPLOS-VIII), Oct. 1998).
"Interconnections, Second Edition,", Table of Contents and Preface, by Radia Perlman (Addison-Wesley, 2000).
Oliver Spatscheck, et al., "Optimizing TCP forwarder performance," IEEE/ACM Transactions on Networking, vol. 8, No. 2, pp. 146-157, Apr. 2000.
Scalable Content-aware Request Distribution in Cluster-based Network Servers, by Mohit Aron et al., Department of Computer Science, Rice University, Houston, Texas 77005, 15 pgs., 2000.

* cited by examiner

*Primary Examiner*—Moustafa M Meky

(57) ABSTRACT

A method and system are disclosed for managing connections in a computer network. In accordance with exemplary embodiments of the present invention, a switch monitors information packets communicated through the switch on a connection between a client and a plurality of servers. Connection information in the switch is managed by the switch, in cooperation with the plurality of servers, upon receipt by the switch of information packets transmitted from the plurality of servers.

37 Claims, 8 Drawing Sheets

METHOD AND SYSTEM FOR MANAGING CONNECTIONS IN A COMPUTER NETWORK

CROSS REFERENCE TO RELATED APPLICATIONS

This application is related to U.S. patent application entitled "Method and System for Managing Fragmented Information Packets in a Computer Network," Ser. No. 10/289,308, now U.S. Patent Application Publication No. 2004/0093425, to U.S. patent application entitled "Method and System for Communicating Information Between a Switch and a Plurality of Servers in a Computer Network," Ser. No. 10/289,282, now U.S. Patent Application Publication No. 2004/0090966, to U.S. patent application entitled "Method and System for Reestablishing Connection Information on a Switch Connected to a Plurality of Servers in a Computer Network," Ser. No. 10/289,311, now U.S. Patent Application Publication No. 2004/0093416, to U.S. patent application entitled "Method and System for Managing Communication in a Computer Network Using Aliases of Computer Network Addresses," Ser. No. 10/289,379, now U.S. Patent Application Publication No. 2004/0093430, and to U.S. patent application entitled "Method and System for Predicting Connections in a Computer Network," Ser. No. 10/289,259, now U.S. Patent Application Publication No. 2004/0093406, each of which is filed even date herewith and each of which is hereby incorporated herein by reference in its entirety.

BACKGROUND

1. Field of the Invention

The present invention relates to computer networks. More particularly, the present invention relates to a method and system for managing connections in a computer network.

2. Background Information

To access information on the Internet and, more particularly, the World Wide Web (WWW), users access websites that offer information and/or services. The information and/or services offered by a website are stored in and provided by computer network servers that are generally located remotely from the user. As the number of Internet users grow, computer network servers can experience an increase in the number of connections from clients to access the information and/or services available on these websites. To handle the increased connection load, the computer network servers can be scaled to meet the increased demand. For example, computer network servers can be replicated and the server replicas can be clustered to meet the increased demand. Thus, as the client connection load increases, more servers can be replicated and clustered. Because of their scalability and flexibility, computer network server clusters have become a popular method of meeting increasing communications traffic demands.

Computer network servers based on clusters of workstations or personal computers (PCs) generally include a specialized "front-end" device that is responsible for distributing incoming requests from clients to one of a number of "back-end" nodes, where the "back-end" nodes are responsible for processing the incoming requests from the clients. The front-end is responsible for handing off new connections and passing incoming data from the client to the back-end nodes. In cluster server architectures, the front-end can use weighted round-robin request distribution to direct incoming requests to the back-end nodes. With weighted round-robin distribution, incoming requests are distributed in round-robin fashion and are weighted by some measure of the load on the different back-ends.

To distribute the communications traffic among the back-end nodes, the front-end acts as a load balancer that attempts to evenly distribute the communications traffic load from the clients among the available back-end nodes. A load balancer can be, for example, a switch that connects the servers to the clients for whom the information and/or services are to be provided. To meet increasing connection loads, the load balancers can be upgraded with faster computer processors and more internal computer memory. To further increase performance and improve connection distribution among the back-end nodes, the front-end can use, for example, the content requested, in addition to information about the load on the back-end nodes, to choose which back-end will handle a particular request.

Content-based request distribution is discussed in, for example, "Locality-Aware Request Distribution in Cluster-Based Network Servers," by Vivek S. Pai, et al. (Proceedings of the ACM Eighth International Conference on Architectural Support for Programming Languages and Operating Systems (ASPLOS-VIII), October 1998), the disclosure of which is incorporated herein by reference in its entirety. However, current load balancers (e.g., front-end switches) do not use the resources offered by the back-end server nodes, which are typically faster and more powerful than the load balancers, to assist the load balancer in determining the distribution of the connections among the back-end nodes. Rather, current load balancers determine request distribution autonomously from the back-end nodes.

One example of a conventional load balancer that can act as a front-end for a computer network cluster is a Layer Four (L4) switch. A L4 switch takes into account Transport Layer information (i.e., Layer Four of the International Organization for Standardization (ISO) Networking model, or ISO model). A discussion of computer network protocols and layers of the ISO model is discussed, for example, in "Interconnections, Second Edition," by Radia Perlman (Addison-Wesley, 2000), the disclosure of which is incorporated herein by reference in its entirety. L4 switches manipulate both the network and transport protocol headers of the communications traffic passing through them to forward the communications traffic to the back-end nodes. A L4 switch can operate with, for example, the Internet Protocol (IP) for the network layer and the Transport Control Protocol (TCP) for the transport layer.

L4 switches distribute traffic on a connection-by-connection basis. The L4 switches initialize and maintain a state of active connections in a table to track the progress of the connections. The state table maps connections to servers. The maintenance of the state table is the responsibility of the switch and the servers do not assist the switch in the maintenance. The switch uses timeouts to manage the opening and closing of connections and, hence, the state table. When acting as a load balancer, the switch can receive load information from servers. However, L4 switches do not use the available resources from the back-end servers to manage the state table.

SUMMARY OF THE INVENTION

A method and system are disclosed for managing connections in a computer network. In accordance with exemplary embodiments of the present invention, a switch monitors information packets communicated through the switch on a connection between a client and a plurality of servers. Connection information in the switch is managed by the switch, in cooperation with the plurality of servers, upon receipt by the switch of information packets transmitted from the plurality of servers.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
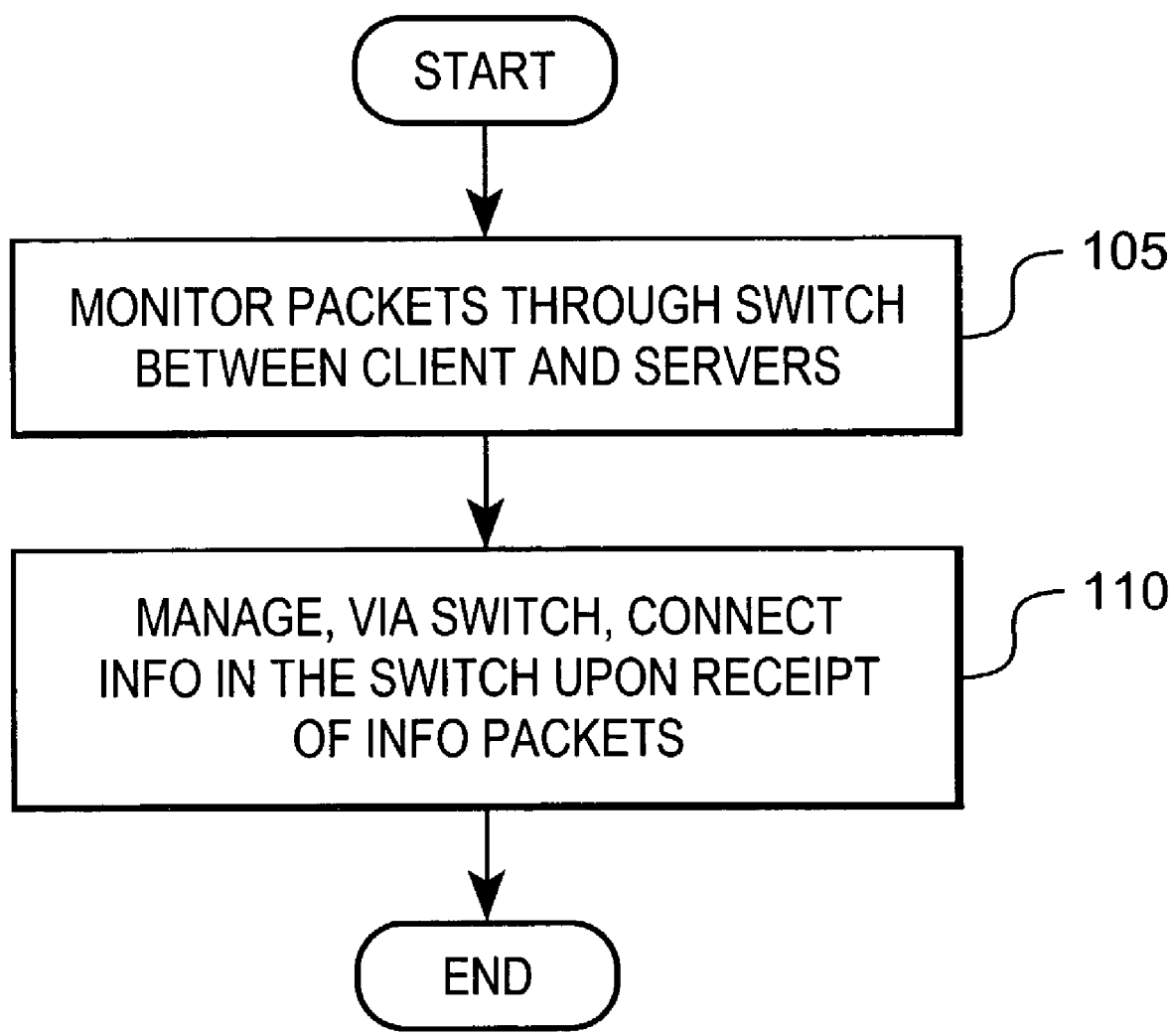
FIG. 1 is a flowchart illustrating steps for managing connections in a computer network in accordance with an exemplary embodiment of the present invention.

FIG. 1 is a flowchart of a method for managing connections in a computer network in accordance with an exemplary embodiment of the present invention. In step 105, a switch monitors information packets communicated through the switch on a connection between a client and a plurality of servers.

According to exemplary embodiments, the switch is a Layer 4 (L4) switch. A L4 switch takes into account Transport Layer Information (i.e., Layer 4 of the ISO model). For example, the L4 switch can examine port numbers of the TCP protocol, although the switch can use other transport and network protocols, such as, for example, UDP. A switch can operate at the Data Link Layer (i.e., Layer 2 of the ISO model). An exemplary Data Link Layer is Ethernet. An Ethernet switch can forward packets without modification.

In contrast to a switch, a router can operate at the Network Link Layer (i.e., Layer 3 of the ISO model). An example of a Network Link Protocol is the Internet Protocol (IP). A network router can interconnect different link layers and generate a new link layer header for each packet passing through the network router. A network router can also manipulate the IP header of packets passing through the network router.

According to exemplary embodiments, the switch can be a hybrid of the Ethernet switch and the network router. For example, the switch can rewrite or otherwise manipulate the link layer header of information packets, but does not modify information packets in the manner performed by routers. According to exemplary embodiments, the switch can use the IP protocol for the network layer and the TCP protocol for the transport layer, although different protocols can be used for the various layers.

The switch can store, maintain, and manage several tables that can be used to forward information packets between the clients and the plurality of servers. Each table is a collection of information that can be stored in any type of computer memory in the switch, such as, for example, Random Access Memory (RAM), a hard disk, or any other type of electronic storage medium. For each table, a key/value pair is used to access information—the key is used to index and locate information in the table and the value is associated with the key.

A table that can be maintained by the switch is a connection table. The connection table maps connections that the switch has been informed about to the server that is handling the connection, wherein information packets are communicated between a client and a server of the plurality of servers over the connection. A value field of the connection table can hold a value or values representing, for example, the name, address or any other designation of a server. The key field can include connection tuples associated with the servers in the value field, and can be used to index or otherwise locate a value in the value field that corresponds to the particular key. According to an exemplary embodiment, the connection table can be a hash table maintained in RAM of the switch. Of course, the value field and the index field can be interchanged.

Another table that can be maintained by the switch is a default content addressable memory (CAM). The default CAM can provide, for example, an initial assignment of connections to servers. According to exemplary embodiments, the default CAM can be a ternary CAM.

A role of the default CAM, according to exemplary embodiments of the present invention, is to implement a dispersal algorithm for handling the absence of connection information in the connection table. The default CAM can be accessed during an initial assignment of connections as mentioned, but can also be accessed when connection information has been lost, deleted, or rendered inaccessible from the connection table for any reason. The dispersal algorithm can be established at the switch by the system in advance, or can be established at the switch by having at least one of the plural servers notify the switch of the dispersal algorithm to be used for allocating computer network address space of the plural servers. In this latter case, a first server can run the dispersal algorithm on all of its connections, and inform all of its potential victim servers of the connections each such victim server will be handling for the first server. Each of the remaining servers can do the same.

An exemplary dispersal algorithm can be a predetermined pattern matching algorithm implemented using a ternary CAM (or other desired mechanism). In a scenario where information (e.g., first information) is directed to the switch from a client, but there is no connection information in the connection table of the switch, the default CAM can be accessed to identify an appropriate so-called victim server to which the first information packet should be forwarded. The servers handle the forwarding of the first information packet from the victim server to the appropriate destination server. A ternary CAM is suitable for use as the default CAM because it is a content addressable memory with "don't care" matching to provide wildcards on various fields of value field as accessed by key field. Thus, the ternary CAM can provide pattern matching. If a value matches several patterns in default CAM, a priority encoder can be used to determine the result. Priority encoders are described, for example, in U.S. Pat. No. 5,964,857, the entire disclosure of which is hereby incorporated herein.

For example, each information packet can include a connection tuple having a designated number of bits used to represent at least five fields for specifying a source Internet Protocol (IP) address, a destination IP address, a source port, a destination port and a protocol. These bits can be considered to designate an address space that can be allocated among the plural servers. In the absence of connection information in the connection table, the default CAM can be accessed to determine a match on a selected number of these bits (e.g., a match on the four least significant bits of the source IP address whereby a first portion of the address space from "0000" to "0010" can be allocated to a first of four servers). The information packet is thus forwarded to the server preassigned to handle any information packets within the first portion of the address space. The servers can have a preestablished mechanism (e.g., victim tables) for forwarding information packets from a particular victim server to an appropriate destination server.

As an alternate to using predetermined pattern matching, the dispersal algorithm can, for example, be a hash function. That is, any or all of the bits received in an information packet can be used to calculate an entry to a hash table, which in turn, designates an appropriate victim server.

In addition to the connection table and default CAM, another table that can be maintained by the switch is a server-alias table. According to exemplary embodiments, the server-alias table can perform several functions. For example, server-alias table can contain a list of the plurality of servers. The name, address or other designation of each of the servers can be a value accessed by a key used to index or otherwise locate information in the server-alias table (e.g., the Ethernet address corresponding to the IP address of a server). The server-alias table can also contain a list of alias addresses for servers that are used by the switch.

In step 110 of FIG. 1, the switch, in cooperation with the plurality of servers, manages connection information in the switch upon receipt by the switch of information packets transmitted from the plurality of servers. According to exemplary embodiments, the plurality of servers can cooperate with the switch to manage tables contained at the switch, such as the connection table, default CAM, and server-alias table in the switch. That is, the plurality of servers can cooperate with the switch in opening and closing connections. Exemplary embodiments provide for serialization of synchronization (SYN) messages used to open a connection, and provide for a transfer of control to a victim server for handling messages relating to the close of a connection (e.g., FIN messages).

In the case of a closing connection, a victim server is designated for a particular server at or around a time at which the server expects no more traffic on the connection (e.g., at that point, for protocols other than TCP, the server can notify a designated victim server before any future, unexpected information packets arrive on the connection). The opening and the closing of a connection according to exemplary embodiments of the invention will now be discussed in turn.

In TCP, the client opens, or initiates, a connection to a server by sending a packet with a SYN set. As this packet passes through the switch, the switch notices the start of a new connection, which triggers the initialization of a new connection entry in the switch's connection table. A problem with allocating the connection table entry on receipt of the client SYN arises, because of a denial of service attack in which a client can issue a large number of SYN packets that consumes the finite table space on the switch. For this reason, connection table space is not allocated on TCP SYNs, in an exemplary embodiment.

However, a possible occurrence of multiple SYNs can be addressed. For example, if the client sends a SYN-1, the switch can choose a server (e.g., a first server) to which to forward the SYN-1 packet because the SYN-1 does not designate any specific server to handle the connection. The switch can use any dispersal algorithm to choose a server, such as, for example, round-robin allocation, least-loaded server, and the like. If the first server is slow, then the SYN-ACK acknowledgment may be delayed for a considerable period of time. Consequently, the client may time out SYN-1 and transmit a SYN-2. When the switch receives the SYN-2, the switch could select another server (e.g., a second server) and forward SYN-2 to it. This is an error, as two servers are now in the process of starting the same connection. Thus, if a client is malicious, it could send several closely-spaced SYN's that can end up being fanned out across the plurality of servers. To resolve such an occurrence, exemplary embodiments of the present invention can serialize the SYN-ACKs and choose the server that responds first.

Figure 2:
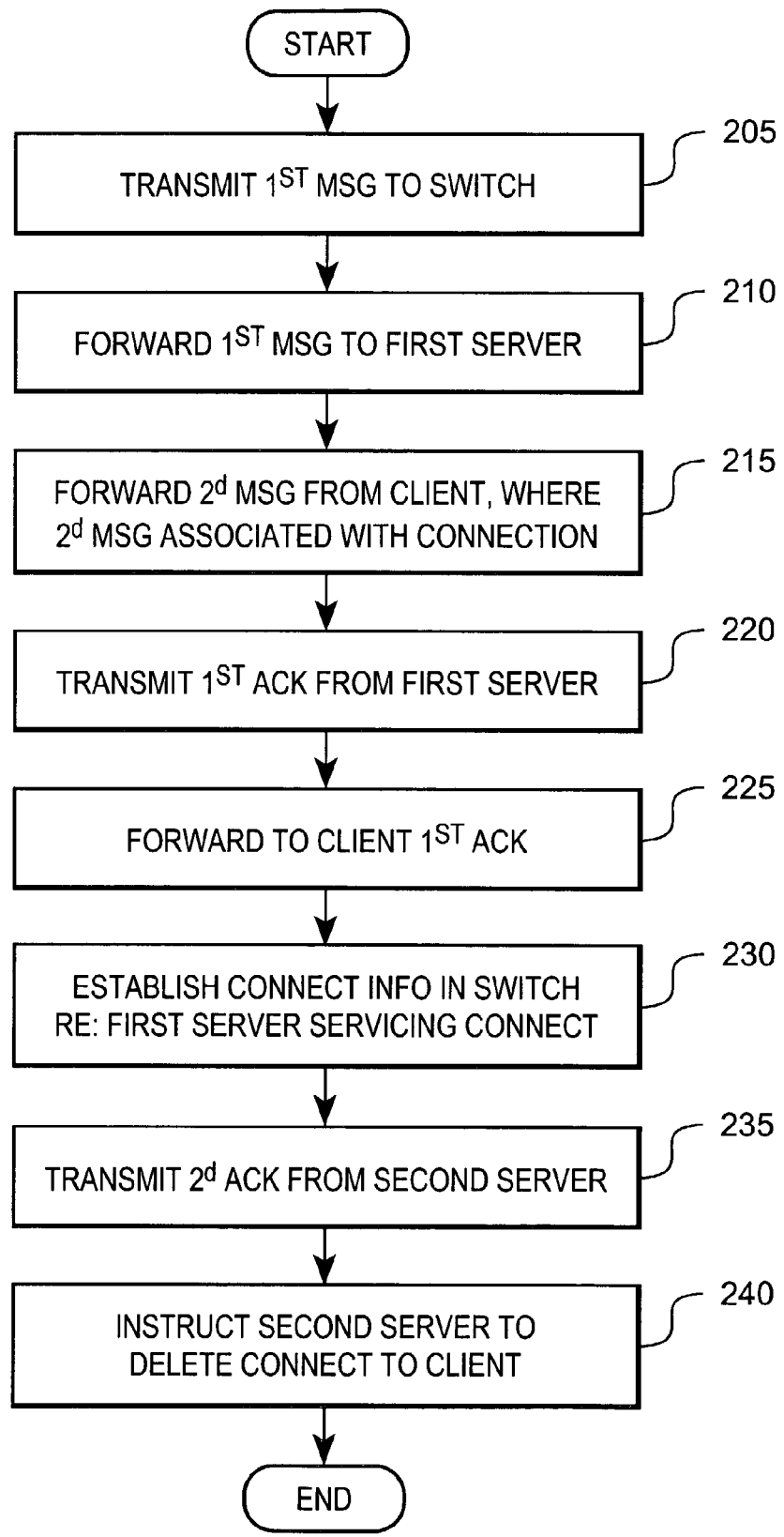
FIG. 2 is a flowchart illustrating steps for establishing a connection in accordance with an exemplary embodiment of the present invention.

FIG. 2 is a flowchart illustrating an exemplary method for establishing a connection in accordance with an exemplary embodiment of the present invention. In step 205, the client transmits a first initiation message (e.g., a SYN-1) to the switch to initiate a connection between the client and the plurality of servers through the switch. In step 210, the switch forwards the first initiation message to a first server of the plurality of servers. If the first server does not respond in time, the client can time out the SYN-1 and transmit a SYN-2 to the switch. In step 215, the switch can forward to a second server of the plurality of servers a second initiation message (e.g., a SYN-2) transmitted from the client. The second initiation message is associated with the same connection as the first initiation message. The client can transmit any number of initiation messages to the plurality of servers through the switch, depending on the time it takes for a server to acknowledge a SYN.

In step 220, a first acknowledgment message (e.g., a SYN1ACK) is transmitted to the switch from the first server. In step 225, the switch forwards the first acknowledgment message to the client from the first server. In step 230, the switch establishes connection information in the switch for the connection upon receipt by the switch of the first acknowledgment message from the first server. The connection information indicates that the first server is servicing the connection to the client.

Thus, for the server that responds first with a SYNACK, the switch can create a connection entry in its connection table that indicates that the server that responded first is handling the connection. For purposes of illustration and not limitation, the first server can be indicated in the switch's connection table as handling the connection to the client. However, any server can be indicated as handling the connection to the client, depending on which server responds first.

In step 235, a second acknowledgment message (e.g., SYN2ACK) is transmitted to the switch from the second server. Thus, the SYN2ACK arrives at the switch from the second server. However, since the first server responded first, the switch already has a connection entry for the connection that indicates that the first server is handling the connection. Consequently, the switch can inform the second server that the connection is already being handled by another server. In step 240, the switch instructs the second server to delete the connection to the client, upon determination by the switch that the first server is servicing or otherwise handling the connection.

Figure 3:
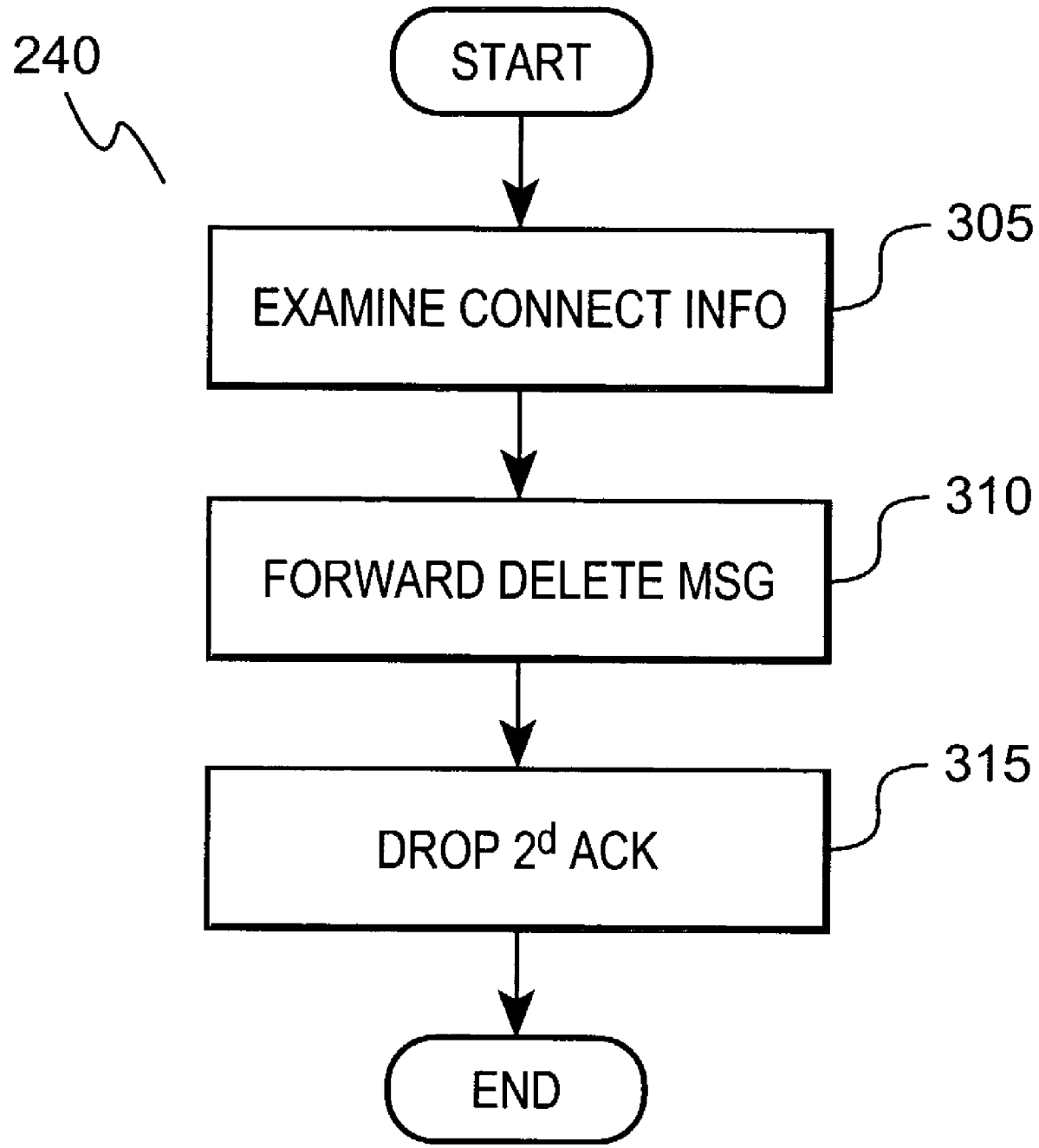
FIG. 3 is a flowchart illustrating steps for instructing a second server to delete a connection in accordance with an exemplary embodiment of the present invention.

FIG. 3 is a flowchart illustrating a method for instructing a second server to delete a connection in accordance with an exemplary embodiment of the present invention. In step 305, the switch examines the connection information to determine whether the connection is being handled by one of the plurality of servers. For example, the switch can search its connection table to determine if a connection entry for the connection exists. If so, then another server is already handling the connection. If another server is handling the connection, in step 310 the switch forwards to the second server a message that indicates that the second server is to delete the connection.

According to exemplary embodiments, the switch can instruct the second server to delete the connection using any method for deleting a connection. For example, the switch can swap the source and destination link layer addresses in the packet from the second server. The second server would then receive a packet in which the IP destination address is the client and not the server. From such a packet, the second server can determine that it is to delete the connection associated with the packet. According to an alternate exemplary embodiment, the switch can generate a reset (RST) connection message and send it to the second server. The reset connection message indicates to the second server that it is to delete the connection specified by the message.

According to an alternate exemplary embodiment, the switch can generate a packet that indicates that an error has occurred (e.g., that an error has occurred in the creation of the connection to the second server) and send such a packet to the second server. Upon receipt of such a packet, the second server can delete the connection. However, any method can be used to instruct the second server to delete the connection to the client. In step 315, the switch drops or otherwise ignores the second acknowledgment message from the at least second server, as the switch has instructed the second server to delete the connection.

According to exemplary embodiments, if the "delete connection" message sent by the switch to the second server gets lost before it reaches the second server, the second server can resend the second acknowledgment message (e.g., the SYN2ACK). Receipt of the second acknowledgment message by the switch can cause another "delete connection" message to be issued by the switch.

The switch can serialize the SYNACKs and choose the server that responds first as the server that will handle the connection to the client. Exemplary embodiments function independently of the order in which the servers respond. For example, if the switch had received the SYN2ACK before the SYN1ACK, then the switch could choose the second server to handle the connection and send a "delete connection" message to the first server.

Thus, the plurality of servers indirectly participate in the initialization of the connection table in the switch when a connection is opened between a client and a server. The plurality of servers can also indirectly participate in updating the connection table in the switch when the connection is closed.

Figure 4:
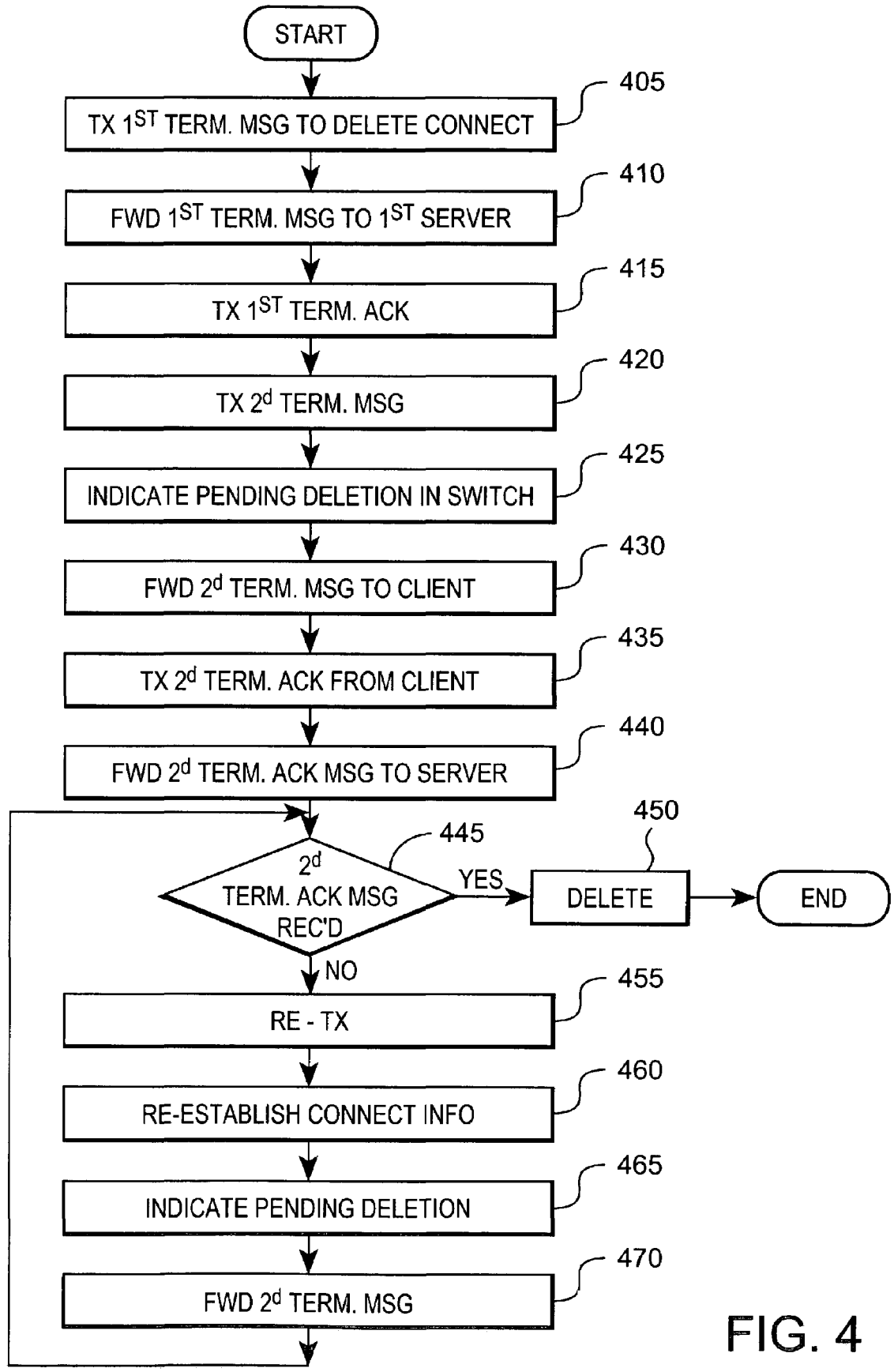
FIG. 4 is a flowchart illustrating steps for closing a connection for a client-active closure in accordance with an exemplary embodiment of the present invention.

Having discussed an exemplary opening of a connection, FIG. 4 is a flowchart of a method for closing a connection for a client-active closure in accordance with an exemplary embodiment of the present invention. In FIG. 4, since the client is initiating an active close, in step 405, the client transmits a first termination message to the switch. The first termination message can initiate a deletion of the connection between the client and the first server through the switch. According to exemplary embodiments, the first termination message can be a FIN packet. In step 410, the switch forwards the first termination message to the first server handling the connection. The switch can search its connection table to determine which server is handling the connection, and then forward the first termination message to that server.

In step 415 the first server transmits a first termination acknowledgment message to the client through the switch. According to exemplary embodiments, the first termination acknowledgment message is an ACK (i.e., an acknowledgment of receipt of the FIN packet). In step 420, the first server transmits a second termination message to the switch. According to exemplary embodiments, the second termination message can be a FIN packet. In step 425, upon receipt of the second termination message from the first server, the switch can indicate in its connection table that the connection information for the connection is pending deletion. The switch can use the address information contained in the second termination message (i.e., the FIN packet) received from the first server to search the switch's connection table for the appropriate entry to mark as pending deletion.

In step 430, the switch forwards the second termination message to the client. In step 435, the client transmits a second termination acknowledgment message to the switch. According to exemplary embodiments, the second termination acknowledgment message can be an ACK packet, referred to herein as a final ACK. In step 440, the switch forwards the second termination acknowledgment message to the first server.

In step 445, the first server determines an absence of the second termination acknowledgment message from the client. In other words, the first server determines whether the final ACK from the client is lost. For example, the first server can use a timer with a predetermined time interval. If the timer expires before the final ACK is received from the client, the first server can consider the second termination acknowledgment message lost.

If the final ACK from the client is not lost, then in step 450, the switch deletes the connection information for the connection upon receipt by the switch of the second termination acknowledgment message from the client. However, if the second termination acknowledgment message (i.e., the final ACK) from the client is lost, then in step 455, the first server can re-transmit the second termination message to the switch. In step 460, the switch can re-establish connection information in the switch for the connection upon receipt of the second termination message from the first server. In step 465, the switch can indicate that the connection information for the connection is pending deletion. Thus, upon receipt by the switch of the second termination message, the switch can re-establish a connection entry in its connection table for the connection between the client and the first server. The connection entry can be created in the pending deletion state.

In step 470, the switch can forward the second termination message to the client. The first server can then wait for the second termination acknowledgment message from the client in step 445. If the second termination acknowledgment message does not arrive (e.g., within a predetermined time interval), then steps 455, 460, 465 and 470 can be repeated. Otherwise, the switch can delete the connection information from its connection table for the connection in step 450.

When the transmission of information packets is delayed, it is possible that future information packets can arrive from the client after a connection has been closed. Once the connection between the server and the client is closed, the connection entry for the connection is deleted from the connection table of the switch. Thus, further information packets from the client can arrive at the switch after the connection is closed, but no connection state exists in the switch for that connection.

Exemplary embodiments of the present invention account for this situation by designating a particular victim server for a given server at or around the time at which the server expects no more traffic on the connection. By designating a victim server at or before the time a connection is closed results in creation of an entry in the switch's default CAM. As such, the switch can then search its default CAM to determine the server to which to forward packet(s) received on a connection which has been closed. The default CAM allocates to servers the handling of information packets for particular connections when no connection information exists in the connection table (i.e., no server is actively handling the connection). The server that is handling the information packets when no connection entry exists in the switch's connection table has been referred to herein as a "victim server." The victim server handles the information packets for a connection on behalf of another server—the server that was or is actually handling the connection. Where a first server was previously handling the connection, the victim server handles the information packets on behalf of the first server.

Figure 5:
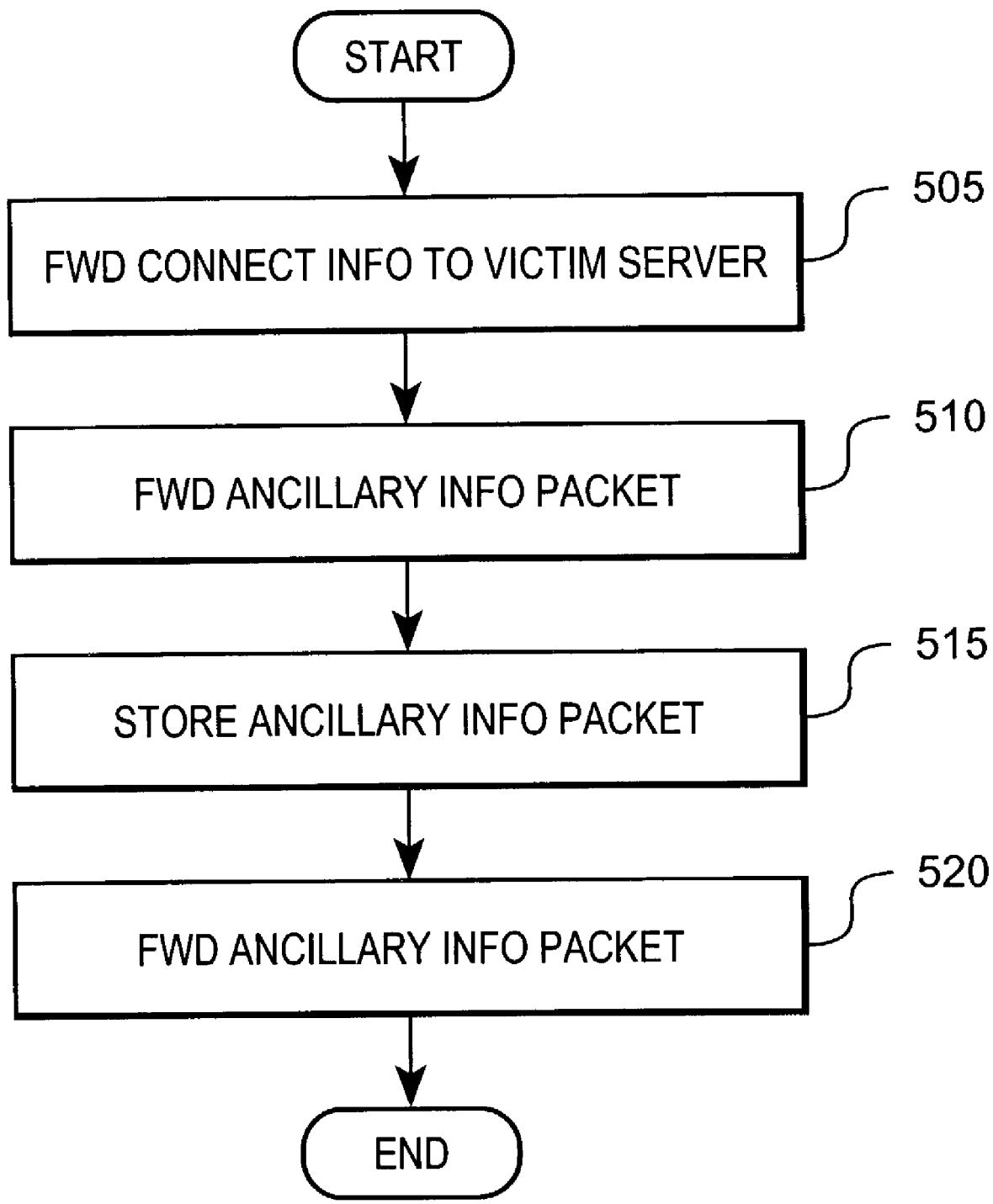
FIG. 5 is a flowchart illustrating the steps for managing information received on closed connections in accordance with exemplary embodiments of the present invention.

FIG. 5 is a flowchart illustrating a method for managing information received on closed connections in accordance with exemplary embodiments of the present invention. In step 505, the first server forwards server connection information to a victim server of the plurality of servers. The server connection information can indicate an additional connection that the victim server is to handle on behalf of the first server, and upon receipt of this server connection information the victim server can update its victim table accordingly. The first server can make its victim server (e.g., a second server of the plurality of servers) aware that the first server is closing the connection so that the victim server can properly handle any information packets received after the connection is closed and the connection entry deleted from the connection table of the switch. The server connection information can be, for example, an information packet with the address of the first server contained in the information packet. Once the victim server receives the address of the first server, the victim server can update its victim table to indicate that the first server is handling information packets on the particular connection.

According to an alternate exemplary embodiment, the server connection information can include an encapsulated message directed to the client. For example, the first server can encapsulate its final information packet (e.g., the second termination message) with the computer network address of the first server and send this encapsulated information packet to the victim server. In such an alternate exemplary embodiment, upon receipt of the encapsulated information packet, the victim server can update its victim table and then forward the final information packet from the first server to the client through the switch on behalf of the first server. According to either exemplary embodiment, once the victim table of the victim server is updated with the information (e.g., the computer network address) of the first server for the connection, the victim server can handle any information packets received on the connection from the client after the connection to the first server has been closed. Consequently, both the first server and the victim server will be aware that the connection is closed. If the victim server receives the second termination acknowledgment message on behalf of the first server, the victim server can forward the message to the first server. Otherwise, the first server can continue to generate second termination messages.

In step 510, the switch forwards a future (e.g., an ancillary or delayed) information packet associated with a closed connection to the victim server indicated by a dispersed algorithm in the default CAM of the switch. Thus, information packets received after the connection to the first server has been closed (e.g., the auxiliary information packets) will be forwarded to the victim server indicated in the default CAM (i.e., the auxiliary connection information) in the switch.

In step 515, the ancillary information packet can be stored in a computer memory of the victim server, which knows the identity of the first server. That is, at any time a dispersal algorithm is changed, each server can determine and notify all of the other servers which will act as its victim servers for specified connections. Each such victim server can then store this relationship in a victim table that it maintains in memory. The computer memory in the victim server can be any type of computer memory, such as, for example, Random Access Memory (RAM), a hard disk, or any other type of electronic storage medium.

Although the victim server is aware of the server to which to forward the ancillary packets, the victim server can buffer or otherwise store the information packets. In step 520, the ancillary information packet can be forwarded from the victim server to the first server.

Figure 6:
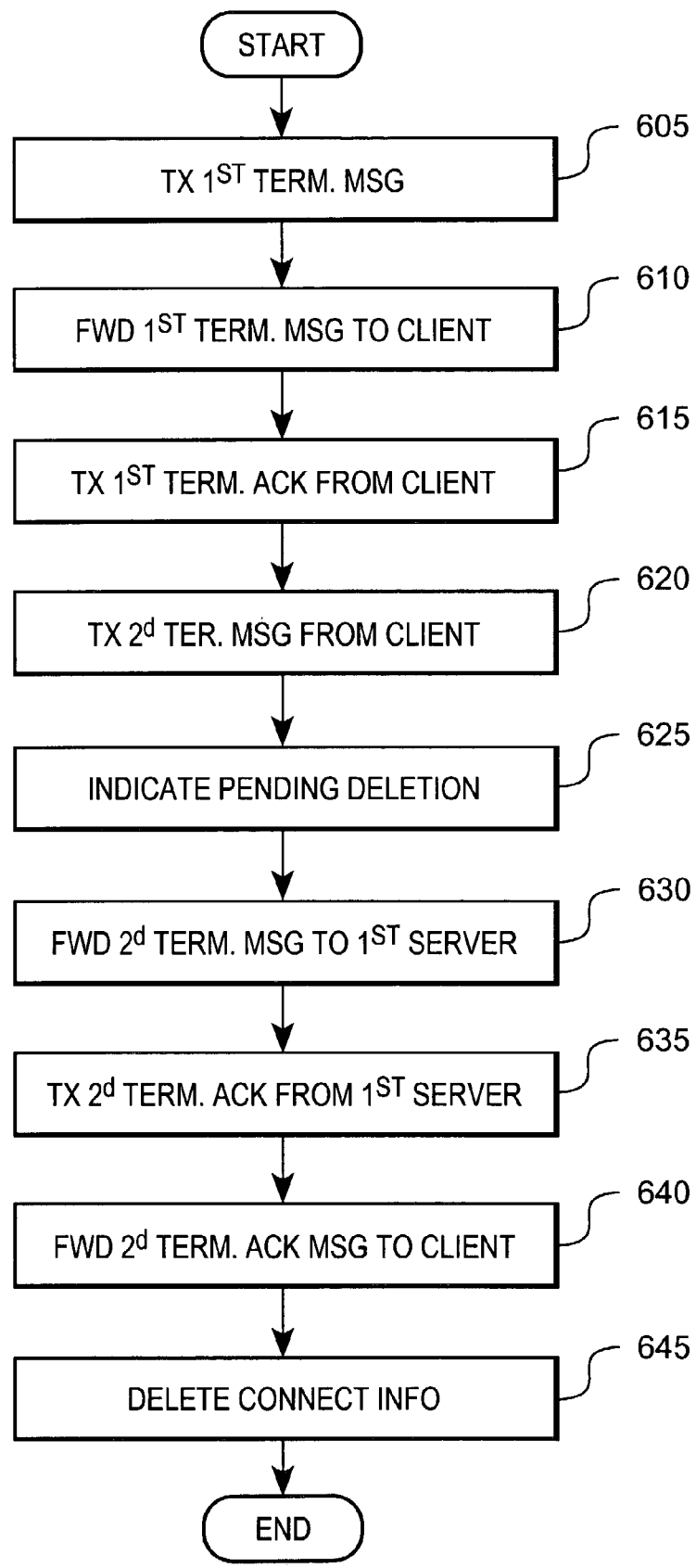
FIG. 6 is a flowchart illustrating steps for closing a connection for a server-active closure in accordance with an exemplary embodiment of the present invention.

Although the client can initiate the closure of a connection, the server handling the connection can also initiate the closure of the connection. FIG. 6 is a flowchart illustrating a method for closing a connection for a server-activated closure in accordance with an exemplary embodiment of the present invention. In step 605, the first server transmits a first termination message to the switch. The first termination message initiates a deletion of the connection between the client and the first server through the switch. The first termination message can be, for example, a FIN packet. In step 610, the switch forwards the first termination message to the client. In step 615, the client transmits a first termination acknowledgment message to the first server through the switch. The first termination acknowledgment message can be, for example, an ACK packet.

In step 620, the client transmits a second termination message to the switch. The second termination message can be, for example, a FIN packet. In step 625, upon receipt of the second termination message from the client, the switch can indicate that the connection information for the connection is pending deletion. For example, the switch can indicate in its connection table that the connection between the client and the first server is pending deletion. In step 630, the switch forwards the second termination message to the first server. In step 635, the first server transmits a second termination acknowledgment message to the switch. The second termination acknowledgment message can be, for example, an ACK packet. In step 640, the switch forwards the second termination acknowledgment message to the client. In step 645, the switch deletes the connection information for the connection.

According to exemplary embodiments, the connection information for the connection can be deleted in the switch upon receipt by the switch of the second termination acknowledgment message from the first server. For example, the switch can delete the connection entry for the connection between the client and the first server from the switch's connection table.

However, the second termination acknowledgment message can be lost during transmission from the switch to the client. This loss can cause the client to retransmit the second termination message (e.g., upon a timeout). If the connection information has been deleted from the switch, then the switch can search its default CAM to determine the victim server to handle the second termination message.

According to an alternate exemplary embodiment, the connection information for the connection is not immediately deleted in the switch upon receipt by the switch of the second termination acknowledgment message. For example, the connection information for the connection can be deleted in the switch after a predetermined time interval. The predetermined time interval can be, for example, the maximum segment lifetime (MSL) of an information packet transmitted within the computer network. The TCP protocol defines the MSL as an upper bound on the time information packets can be in transit through the computer network. Thus, according to this alternate exemplary embodiment, the switch can maintain the connection information for the connection for the MSL of the information packet, or any multiple or fraction thereof, and delete the connection information after the MSL expires.

According to an alternate exemplary embodiment, the switch can use "pass marking" to delete the connection information from its connection table. In pass marking, each connection entry in the connection table has an associated use flag (e.g., a bit flag) that indicates whether the connection is active or inactive. As information packets pass through the switch, the switch searches its connection table for a connection entry corresponding to the connection. If a connection entry exists in the connection table, the switch can mark the use flag for the connection entry as active (e.g., set the use flag to "1" or any other designation indicating "IN USE"). The switch can have a pass marking process running in the switch concurrently with the connection entry lookup. At predetermined time intervals, the pass marking process can scan or otherwise search through each entry in the connection table and set the use flags of each entry to inactive (e.g., set the use flag to "0" or any other designation indicating "NOT USED"). The predetermined time interval used by the pass marking process can be of any duration. When the switch searches the connection table as part of a connection lookup, if the use flag indicates inactivity, then the switch can determine that the connection has not been used since the last pass marking pass through the connection table. Thus, the connection entry can be a candidate for deletion from the connection table. The connection entry can then be deleted after any predetermined time interval (e.g., the predetermined time interval for the pass marking process, a multiple or fraction thereof, or any other predetermined time interval), or in response to any desired command.

According to an alternate exemplary embodiment, the predetermined time interval for deleting connection information in the switch can be determined by the first server. As part of the TCP protocol, during the lifetime of a connection, the server handling the connection estimates the round trip time (RTT) of a transmitted packet. Thus, the predetermined time interval determined by the first server can be the RTT for transmitting and receiving an information packet between the first server and the client. For example, when the first server transmits the second termination acknowledgment message (e.g., an ACK), the first server can use the RTT estimate to set a timer that covers the window during which the first server can expect, for example, a retransmitted second termination message (indicating a loss of the second termination acknowledgment message from the first server). When the timer expires, the first server can then issue a message to the switch indicating (and/or confirming) that the connection information for the connection can be deleted from the switch's connection table. Consequently, the first server can instruct the switch to delete the connection information on the switch for the connection, at an expiration of the predetermined time interval.

Figure 7:
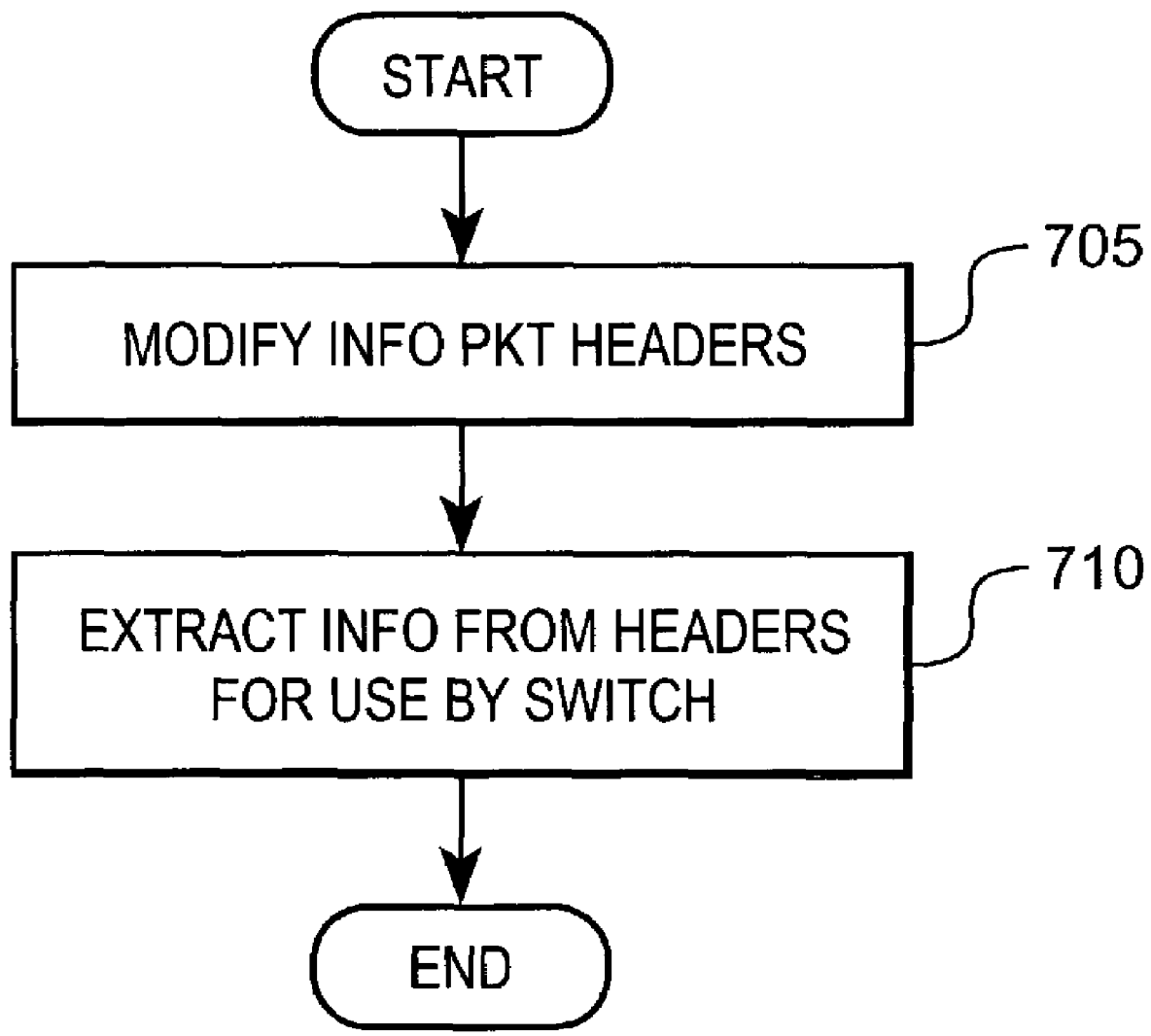
FIG. 7 is a flowchart illustrating the steps for communicating computer network information to a switch from a plurality of servers using modified information packets in accordance with exemplary embodiments of the present invention.

As described in, for example, U.S. patent application entitled "Method and System for Communicating Information Between a Switch and a Plurality of Servers in a Computer Network," Ser. No. 10/289,282, the headers of the information packets transferred between the switch and the plurality of servers can be used to communicate computer network information from the servers to the switch for use by the switch. FIG. 7 is a flowchart illustrating a method for communicating computer network information to a switch from a plurality of servers using modified information packets in accordance with exemplary embodiments of the present invention.

In step 705, the plurality of servers modify the headers of the information packets communicated from the plurality of servers to the switch to include computer network information for use by the switch. According to exemplary embodiments, the computer network information is control information used by the switch to modify the connection information in the switch. For example, the computer network information can be used by the switch to modify or otherwise alter connection entries in the connection table maintained by the switch. However, the computer network information can be any type of information that can be communicated from the plurality of servers to the switch for use by the switch. In step 710, the switch extracts the computer network information from the modified information packets for use by the switch. For example, the switch can use the extracted computer network information to modify its connection table.

Exemplary embodiments of the present invention can use the TCP protocol for the L4 packet layer. However, those skilled in the art will recognize that other transport layer and network protocols, such as, for example, the UDP protocol, can be used in accordance with exemplary embodiments for the L4 packet layer.

Figure 8:
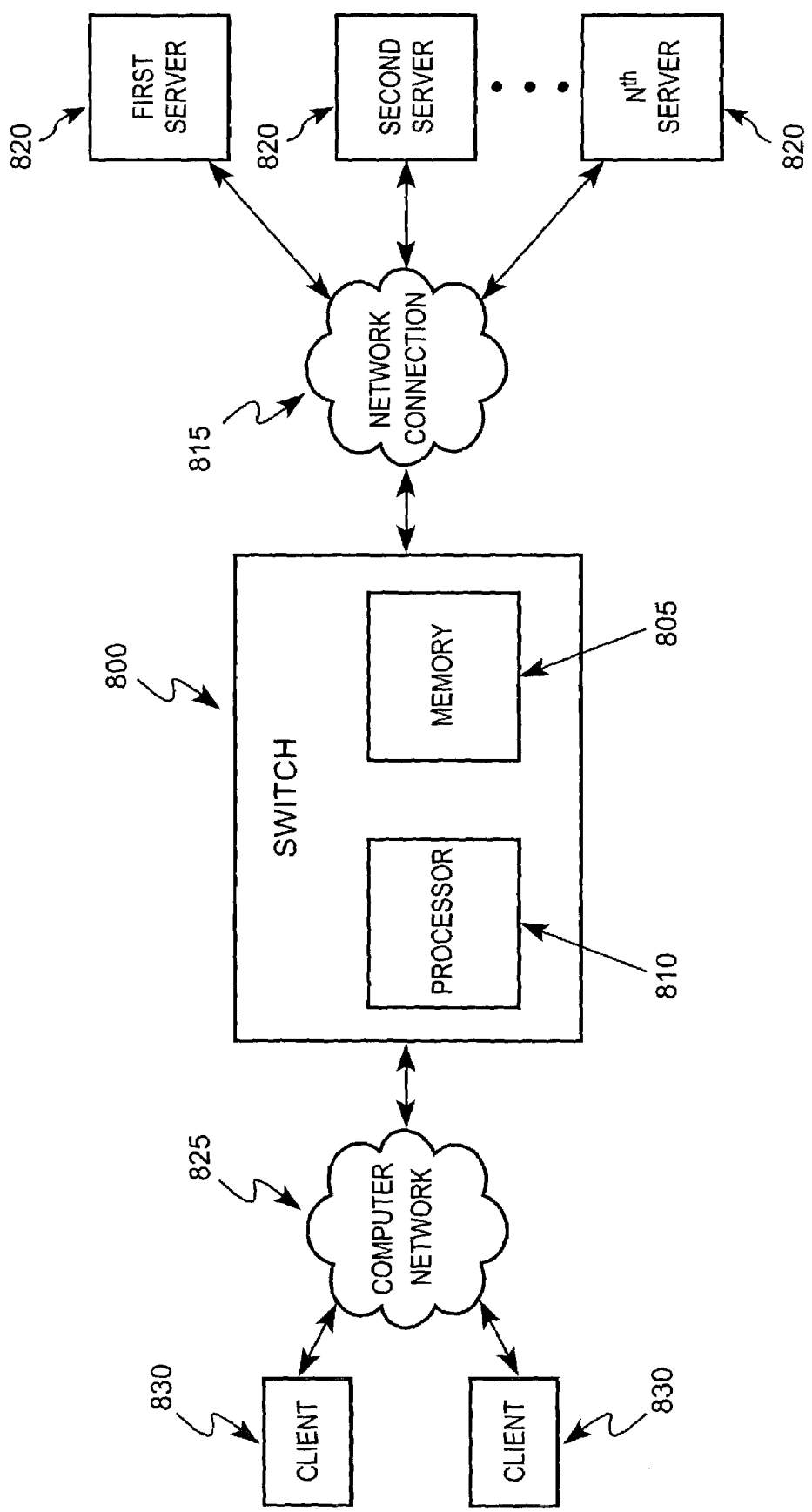
FIG. 8 is a block diagram illustrating a switch for managing connections in a computer network in accordance with an exemplary embodiment of the present invention.

FIG. 8 is a block diagram illustrating a switch 800 for managing connections in a computer network in accordance with an exemplary embodiment of the present invention. Switch 800 can include a memory device 805 for storing connection information associated with a connection through the switch between a client 830 and a plurality of servers 820. Memory device 805 can be any computer memory or any other type of electronic storage medium that is located either internally or externally to switch 800.

According to exemplary embodiments, the FIG. 8 computer network can be any type of computer network in which information in the form of packets can be transmitted, received, otherwise communicated within and throughout the computer network. For example, the computer network can be a local area network (LAN), wide area network (WAN), any type of intranet or internet, or any other type of computer network or computer system capable of transporting packets of information.

As used herein, an "information packet" can be any format of aggregated bits that forms a protocol data unit (PDU) that is capable of carrying any type of information over a packet-switching network. The information packet can carry, for example, data, commands, or any other type of information. According to exemplary embodiments, an information packet can be a transmission control protocol (TCP) PDU, a user datagram protocol (UDP) PDU, or any other form of packet that is capable of carrying any type of information over a packet-switching network.

According to exemplary embodiments, each of the plurality of servers can store, maintain, and manage several tables for connection management. Each table is a collection of information that can be stored in any type of computer memory in each of the plurality of servers, such as, for example, Random Access Memory (RAM), a hard disk, or any other type of electronic storage medium. For each table, a key/value pair can be used to access information—the key is used to index and locate information in the table and the value is associated with the key.

Each of the plurality of servers can have a connection table. The server connection table can contain a list of the connections for which the server is the terminating server. In other words, the server connection table lists those connections that the server is handling. Each of the plurality of servers also includes a victim table. The victim table can contain the connection information that the server handles on behalf of another server. In other words, the victim table lists the non-terminating connections on which the server receives, for example, fragmented packets. For each of the fragmented packets received on the non-terminating connection, the victim table lists the terminating server to which the non-terminating server can relay the fragmented packets. The victim tables can be populated as a function of the selected dispersal algorithm.

For purposes of illustration, IP addresses are denoted by uppercase letters (e.g., C1, C2, S, T, U). Ethernet addresses (i.e., Medium Access Control (MAC) addresses) are denoted by lowercase letters (e.g., c1, c2, s, t, u).

According to exemplary embodiments, the switch can connect a plurality of servers to clients over the computer network. Thus, the switch can act as a "front-end" to the plurality of servers, while the plurality of servers can act as the "back-end." According to exemplary embodiments, IP aliasing can be used when communicating information packets between the plurality of servers and the clients through the switch. With IP aliasing, the switch and the plurality of servers can be addressed to clients using a single, collective IP address (e.g., an address "V"). In other words, the switch and the plurality of servers appear as a single computer system with a single IP address (e.g., address "V"), such that "knowledge" of the separate components is hidden from the clients.

Thus, when a client addresses the switch and/or any of the plurality of servers, the client simply sends an information packet to a single IP address (e.g., address "V"). The switch can then direct the packet to the server handling the connection to the client. When sending information packets to clients using IP aliasing, each of the plurality of servers can write the IP source address as the single, collective IP address (e.g., address "V"), and not the server's unique IP address. However, according to exemplary embodiments, at the Ethernet layer, each of the plurality of servers can use their individual Ethernet addresses (i.e., MAC address) as their source Ethernet address.

According to exemplary embodiments, amongst the Layer 2 (L2) (i.e., Ethernet) packet layer, Layer 3 (L3) (i.e., IP) packet layer, and the L4 (e.g., TCP) packet layer, there are six fields which can used to represent packets: an Ethernet destination address (from the L2 packet layer); an Ethernet source address (from the L2 packet layer); a source IP address (from the L3 packet layer); a destination IP address (from the L3 packet layer); a source port (from the L4 packet layer); and a destination port (from the L4 packet layer). Those skilled in the art will appreciate that an additional protocol field can be included (e.g., to identify TCP), and need not be discussed further. For purposes of illustration and not limitation, a packet from a first client (e.g.,"C1") to the switch and plurality of servers (i.e., "V") can have the following fields, where "s" represents the Ethernet address of a first server, "x" represents the Ethernet address of the switch, and "PA" and "PB" are the source and destination TCP ports, respectively: [x, c1, C1, V, PA, PB]. For example, if the first server is handling the connection, the switch can rewrite the packet as: [s, x, C1, V, PA, PB]. When the server sends a reply, the server uses the IP alias "V" instead of its own IP address. Consequently, the reply packet is: [x, s, V, C1, PB, PA].

As noted, the reply packet swaps the source and destination IP address. From this swapping a canonical addressing format can be used to represent packets as follows: <client IP address, server IP address, client port, server port>. In accordance with exemplary embodiments of the present invention, the canonical addressing format can be used to represent packets and connections. According to exemplary embodiments, if the packet came from a client, then the fields are in canonical form. If the packet came from a server, then the fields can be swapped to generate the canonical form. The switch can use its server-alias table to determine if the packet was sent by a server, and, therefore, the fields should be rearranged. If "V" is the source IP address, then the fields should be swapped. By using a canonical form in accordance with exemplary embodiments, the switch's connection table can use a single entry to track a connection for each packet direction. Alternatively, two indices can be used—one for each packet direction.

In the FIG. 8 example, a system is shown which includes a switch 800 that can communicate information packets with one or more clients 830 through computer network 825. According to exemplary embodiments, computer network 825 can be any type of computer network in which information in the form of packets can be transmitted, received, otherwise communicated within and throughout the computer network. Clients 830 can be any type of computer system, such as, for example, a personal computer (PC), a workstation, a minicomputer, a supercomputer, or any other form of computer system capable of transmitting and receiving information packets over computer network 825. Switch 800 can be connected to clients 825 remotely. If connected remotely, computer network 825 can be any form of WAN or for example, the Internet. However, switch 800 can be connected to clients 830 locally using, for example, a LAN or a direct connection to switch 800.

According to exemplary embodiments, each of plurality of servers 820 can be any type of computer system, such as, for example, a personal computer (PC), a workstation, a minicomputer, a supercomputer, or any other form of computer system capable of transmitting and receiving information packets over a computer network. Exemplary embodiments of the present invention can include any number of servers 820.

The plurality of servers 820 can be connected to switch 800 through a network 815. Network 815 can be any type of computer network, such as, for example, a LAN, WAN, or any form of intranet where the Layer 2 header is preserved. The plurality of servers 820 can be connected to switch 800 through the network 815 using any form of computer network connection, such as, for example, an Ethernet connection. According to an alternate embodiment, the plurality of servers 820 can be connected directly to the switch 900 using any form of connection (e.g., electrical, optical, wireless, wired or the like) capable of transmitting and receiving information between the plurality of servers 820 and the switch 800. In such an alternate embodiment, the network connection through the network 815 is a direct connection. According to exemplary embodiments, although the plurality of servers 820 can communicate with the clients 830 through the switch 800, the plurality of servers 820 can send additional information packets to the clients 830 through the computer network 825 using alternate mechanisms. For example, the plurality of servers 829 can also include additional network interfaces that connect each of the servers 820 to the computer network 825 so that computer network communication can take place without the use of the switch 800.

According to exemplary embodiments, the switch 800 can be a L4 switch that can be a hybrid of the Ethernet switch and the network router. For example, the switch 800 can rewrite or otherwise manipulate the link layer header of information packets, but does not modify information packets in the manner performed by routers. According to exemplary embodiments, the switch 800 can use the IP protocol for the network layer and the TCP protocol for the transport layer, although different protocols can be used for the various layers.

Switch 800 can include a processor 810 for monitoring information packets communicated through the switch 800 on the connection, and for managing the connection information, in cooperation with the plurality of server 820, upon receipt of information packets transmitted from the plurality of servers 820. Processor 810 can be any type of processor, such as, for example, a microprocessor. According to exemplary embodiments, the plurality of servers 820 can cooperate with the switch 800 to manage, for example, the connection table, default CAM, and server-alias table stored in the memory device 805 of the switch 800. The FIG. 8 system can perform any one or more of the methods already described herein.

As described in, for example, U.S. patent application entitled "Method and System for Communicating Information Between a Switch and a Plurality of Servers in a Computer Network," Ser. No. 10/289,282, now U.S. Patent Application Publication No. 2004/0090966, the headers of the information packets transferred between the switch and the plurality of servers can be used to communicate computer network information from the servers to the switch for use by the switch.

The steps of a computer program as illustrated in FIGS. 1-8 for managing connections in a computer network can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for managing connections in a computer network, comprising:

monitoring, by a switch, information packets communicated through the switch on a connection between a client and a plurality of servers;

managing, by the switch in cooperation with the plurality of servers, connection information in the switch upon receipt by the switch of information packets transmitted from the plurality of servers;

transmitting initiation messages from the switch to corresponding multiple ones of the plurality of servers, wherein the initiation messages are for initiating the connection; and establishing the connection information based on which of the multiple ones of the plurality of servers is first to acknowledge a respective one of the initiation messages.

2. The method of claim 1, comprising:

modifying, by the plurality of servers, headers of the information packets communicated from the plurality of servers to the switch to include computer network information for use by the switch; and extracting, by the switch, the computer network information from the modified information packets for use by the switch.

3. The method of claim 2, wherein the computer network information is control information used by the switch to modify the connection information in the switch.

4. A method for managing connections in a computer network, comprising:

monitoring, by a switch, information packets communicated through the switch on a connection between a client and a plurality of servers;

managing, by the switch in cooperation with the plurality of servers, connection information in the switch upon receipt by the switch of information packets transmitted from the plurality of servers;

receiving, by the switch from the client, a first initiation message to initiate the connection between the client and the plurality of servers through the switch;

forwarding, by the switch, the first initiation message to a first server of the plurality of servers;

forwarding, by the switch, to at least a second server of the plurality of servers at least a second initiation message transmitted from the client, wherein the at least second initiation message is associated with the connection;

receiving, by the switch, a first acknowledgment message from the first server;

establishing connection information in the switch for the connection upon receipt by the switch of the first acknowledgment message from the first server, wherein the connection information indicates that the first server is servicing the connection to the client;

receiving, by the switch, at least a second acknowledgment message from the at least second server; and instructing the at least second server, by the switch, to delete the connection to the client, upon determination by the switch that the first server is servicing the connection.

5. The method of claim 4, comprising:

forwarding to the client, by the switch, the first acknowledgment message from the first server.

6. The method of claim 4, wherein the instructing comprises:

examining, by the switch, the connection information to determine whether the connection is being handled by a server of the plurality of servers.

7. The method of claim 4, wherein the instructing comprises:
forwarding to the at least second server, by the switch, a message that indicates that the at least second server is to delete the connection.

8. The method of claim 7, wherein the message is a reset connection message.

9. The method of claim 4, wherein the instructing comprises:
dropping, by the switch, the at least second acknowledgment message from the at least second server.

10. A method for managing connections in a computer network, comprising:
monitoring, by a switch, information packets communicated through the switch on a connection between a client and a plurality of servers;
managing, by the switch in cooperation with the plurality of servers, connection information in the switch upon receipt by the switch of information packets transmitted from the plurality of servers;
receiving a first termination message by the switch from the client, wherein the first termination message initiates a deletion of the connection between the client and the first server through the switch;
forwarding, by the switch, the first termination message to the first server handling the connection;
transmitting, to the client by the switch, a first termination acknowledgment message from the first server;
receiving, by the switch, a second termination message from the first server;
indicating in the switch that the connection information for the connection is pending deletion, upon receipt of the second termination message from the first server;
forwarding, by the switch, the second termination message to the client;
receiving, by the switch, a second termination acknowledgment message from the client; and
deleting, in the switch, the connection information for the connection upon receipt by the switch of the second termination acknowledgment message from the client.

11. The method of claim 10, comprising:
forwarding, by the switch, the second termination acknowledgment message to the first server.

12. The method of claim 10, comprising:
determining, by the first server, an absence of the second termination acknowledgment message from the client;
re-transmitting, to the switch, the second termination message from the first server;
reestablishing, by the switch, connection information in the switch for the connection upon receipt of the second termination message from the first server; and
indicating by the switch that the connection information for the connection is pending deletion.

13. The method of claim 12, comprising:
forwarding, by the switch, the second termination message to the client.

14. A method for managing connections in a computer network, comprising:
monitoring, by a switch, information packets communicated through the switch on a connection between a client and a plurality of servers;
managing, by the switch in cooperation with the plurality of servers, connection information in the switch upon receipt by the switch of information packets transmitted from the plurality of servers; and
forwarding server connection information from a first server of the plurality of servers to a victim server of the plurality of servers, wherein the server connection information indicates an additional connection that the victim server is to handle on behalf of the first server.

15. The method of claim 14, wherein the server connection information includes an encapsulated message directed to the client by the first server.

16. The method of claim 14, comprising:
forwarding, by the switch, an ancillary information packet to the victim server indicated by auxiliary connection information on the switch.

17. The method of claim 16, comprising:
storing the ancillary information packet in a computer memory of the victim server until the victim server receives the server connection information from the first server.

18. The method of claim 17, comprising:
forwarding the ancillary information packet from the victim server to the first server indicated in the server connection information.

19. A method for managing connections in a computer network, comprising:
monitoring, by a switch, information packets communicated through the switch on a connection between a client and a plurality of servers;
managing, by the switch in cooperation with the plurality of servers, connection information in the switch upon receipt by the switch of information packets transmitted from the plurality of servers;
receiving a first termination message by the switch from the first server, wherein the first termination message initiates a deletion of the connection between the client and the first server through the switch;
forwarding, by the switch, the first termination message to the client;
transmitting, to the first server by the switch, a first termination acknowledgment message from the client;
transmitting, to the switch, a second termination message from the client;
indicating in the switch that the connection information for the connection is pending deletion, upon receipt of the second termination message from the client;
forwarding, by the switch, the second termination message to the first server;
receiving, by the switch, a second termination acknowledgment message from the first server; and
deleting, in the switch, the connection information for the connection.

20. The method of claim 19, comprising:
forwarding server connection information from the first server to a victim server of the plurality of servers, wherein the server connection information indicates connections that the victim server handles on behalf of the first server.

21. The method of claim 20, comprising:
forwarding, by the switch, an ancillary information packet to the victim server indicated by auxiliary connection information in the switch.

22. The method of claim 21, comprising:
storing the ancillary information packet in a computer memory of the victim server until the victim server receives the server connection information from the first server.

23. The method of claim 22, comprising:
forwarding the ancillary information packet from the victim server to the first server indicated in the server connection information.

24. The method of claim 19, wherein the connection information for the connection is deleted in the switch upon receipt by the switch of the second termination acknowledgment message from the first server.

25. The method of claim 19, comprising:
forwarding, by the switch, the second termination acknowledgment message to the client.

26. The method of claim 19, wherein the connection information for the connection is deleted in the switch after a predetermined time interval.

27. The method of claim 26, wherein the predetermined time interval is the maximum segment lifetime of an information packet transmitted within the computer network.

28. The method of claim 26, wherein the predetermined time interval is determined by the first server.

29. The method of claim 28, wherein the predetermined time interval determined by the first server is the round trip time for transmitting and receiving an information packet between the first server and the client.

30. The method of claim 26, wherein the first server instructs the switch to delete the connection information on the switch for the connection, at an expiration of the predetermined time interval.

31. A switch for managing connections in a computer network, comprising:
a memory device for storing connection information associated with a connection through the switch between a client and a plurality of servers; and
a processor for:
monitoring information packets communicated through the switch on the connection;
managing the connection information, in cooperation with the plurality of servers, upon receipt of information packets transmitted from the plurality of servers;
forwarding a first initiation message to a first server of the plurality of servers, wherein the first initiation message is associated with the connection and is transmitted by the client to the switch to initiate the connection;
forwarding to at least a second server of the plurality of servers at least a second initiation message transmitted from the client, wherein the at least second initiation message is associated with the connection;
receiving, from the first server, a first acknowledgment message to the switch;
establishing the connection information in the switch for the connection upon receipt of the first acknowledgment message from the first server, wherein the connection information indicates that the first server is servicing the connection to the client;
receiving, from the at least second server, at least a second acknowledgment message; and
instructing the at least second server to delete the connection to the client, upon determination by the switch that the first server is servicing the connection.

32. The switch of claim 31,
wherein a first termination message transmitted by the client initiates a deletion of the connection between the client and the first server through the switch,
wherein the switch forwards the first termination message to the first server handling the connection,
wherein the switch receives, from the server, a first termination acknowledgment message,
wherein the switch receives, from the first server, a second termination message,
wherein the switch indicates that the connection information for the connection is pending deletion, upon receipt of the second termination message from the first server,
wherein the switch forwards the second termination message to the client,
wherein the switch receives, from the client, a second termination acknowledgment message, and
wherein the switch deletes the connection information for the connection upon receipt by the switch of the second termination acknowledgment message from the client.

33. The switch of claim 32, wherein the first server determines an absence of the second termination acknowledgment message from the client,
wherein the first server re-transmits to the switch the second termination message from the first server,
wherein the switch reestablishes connection information in the switch for the connection upon receipt by the switch of the second termination message from the first server, and
wherein the switch indicates that the connection information for the connection is pending deletion.

34. The switch of claim 31, wherein:
server connection information is forwarded from a first server of the plurality of servers to a victim server of the plurality of servers, wherein the server connection information indicates an additional connection that the victim server is to handle on behalf of the first server.

35. The switch of claim 34, wherein the server connection information includes an encapsulated message directed to the client by the first server.

36. The switch of claim 31,
wherein a first termination message from the first server initiates a deletion of the connection between the client and the first server through the switch,
wherein the switch forwards the first termination message to the client,
wherein the switch receives, from the client, a first termination acknowledgment message,
wherein the switch receives, from the client, a second termination message,
wherein the switch indicates that the connection information for the connection is pending deletion, upon receipt by the switch of the second termination message from the client,
wherein the switch forwards the second termination message to the first server,
wherein the switch receives, from the first server, a second termination acknowledgment message, and
wherein the switch deletes the connection information for the connection upon receipt of the second termination acknowledgment message from the first server.

37. The switch of claim 31, wherein the headers of the information packets communicated from the plurality of servers to the switch are modified to include computer network information for use by the switch, and
wherein the switch extracts the computer network information from the modified information packets for use by the switch.

* * * * *

UNITED STATES PATENT AND TRADEMARK OFFICE
CERTIFICATE OF CORRECTION

PATENT NO. : 7,483,980 B2
APPLICATION NO. : 10/289288
DATED : January 27, 2009
INVENTOR(S) : David Andrew Thomas Page 1 of 1

It is certified that error appears in the above-identified patent and that said Letters Patent is hereby corrected as shown below:

In column 19, line 19, in Claim 28, delete "server," and insert -- server. --, therefor.

In column 20, line 10, in Claim 32, delete "c1ient" and insert -- client --, therefor.

In column 20, line 57, in Claim 37, after "wherein" delete "the".

Signed and Sealed this

Twenty-sixth Day of May, 2009

JOHN DOLL
*Acting Director of the United States Patent and Trademark Office*